United States Patent
Gottschalk et al.

(10) Patent No.: US 12,406,046 B2
(45) Date of Patent: Sep. 2, 2025

(54) SYSTEM AND METHOD FOR AUTHENTICATION ON A DEVICE

(71) Applicant: BSH Hausgeraete GmbH, Munich (DE)

(72) Inventors: Richard Gottschalk, Regensburg (DE); Andreas Rehberg, Nittendorf (DE)

(73) Assignee: BSH Hausgeraete GmbH, Munich (DE)

(*) Notice: Subject to any disclaimer, the term of this patent is extended or adjusted under 35 U.S.C. 154(b) by 243 days.

(21) Appl. No.: 17/624,443

(22) PCT Filed: Jun. 30, 2020

(86) PCT No.: PCT/EP2020/068329
§ 371 (c)(1),
(2) Date: Jan. 3, 2022

(87) PCT Pub. No.: WO2021/001334
PCT Pub. Date: Jan. 7, 2021

(65) Prior Publication Data
US 2022/0350874 A1  Nov. 3, 2022

(30) Foreign Application Priority Data
Jul. 4, 2019 (DE) .................. 102019209888.6

(51) Int. Cl.
*G06F 21/33* (2013.01)
(52) U.S. Cl.
CPC ................... *G06F 21/33* (2013.01)

(58) Field of Classification Search
CPC ..... G06F 21/33; H04L 9/0897; H04L 9/3234; H04L 9/3263; H04L 9/3271; H04L 63/0823; H04L 2209/805
See application file for complete search history.

(56) References Cited

U.S. PATENT DOCUMENTS

| | | | |
|---|---|---|---|
| 5,982,898 A | 11/1999 | Hsu et al. | |
| 7,278,582 B1 * | 10/2007 | Siegel | H04L 9/0897 235/487 |
| 10,382,461 B1 * | 8/2019 | Sharifi Mehr | H04L 63/1425 |
| 2002/0056747 A1 | 5/2002 | Matsuyama et al. | |

(Continued)

FOREIGN PATENT DOCUMENTS

| CN | 101674304 A | 3/2010 |
|---|---|---|
| DE | 102017211267 A1 | 1/2019 |

OTHER PUBLICATIONS

Sarmenta, Luis FG, et al. "Offline count-limited certificates." Proceedings of the 2008 ACM symposium on Applied computing. 2008. (Year: 2008).*

(Continued)

*Primary Examiner* — Robert B Leung
(74) *Attorney, Agent, or Firm* — Laurence A. Greenberg; Werner H. Stemer; Ralph E. Locher

(57) ABSTRACT

A method for the authentication on a device includes a step of providing a certificate, the certificate enabling a limited number N of authentication processes. The method further includes a step of carrying out an authentication process on the device, and a step of reducing the number N of authentication processes that are still possible for the certificate.

12 Claims, 3 Drawing Sheets

(56) References Cited

U.S. PATENT DOCUMENTS

| | | | |
|---|---|---|---|
| 2006/0085848 A1* | 4/2006 | Aissi | H04L 63/0869 |
| | | | 726/9 |
| 2008/0022412 A1* | 1/2008 | Challener | G06F 21/62 |
| | | | 726/27 |
| 2012/0297200 A1* | 11/2012 | Thom | G06F 21/602 |
| | | | 713/189 |
| 2014/0101439 A1* | 4/2014 | Pettigrew | H04L 9/3268 |
| | | | 726/7 |
| 2014/0173695 A1* | 6/2014 | Valdivia | G06F 21/33 |
| | | | 726/4 |
| 2019/0268307 A1* | 8/2019 | Lancioni | H04L 63/0263 |
| 2019/0357023 A1* | 11/2019 | Park | H04W 84/18 |
| 2020/0169427 A1* | 5/2020 | Wu | H04N 21/43615 |

OTHER PUBLICATIONS

"Secure access module". Wikipedia. Published Apr. 2017. Retrieved on May 29, 2024 from: https://web.archive.org/web/20170204190218/https://en.wikipedia.org/wiki/Secure_access_module. (Year: 2017).*

"Smart card". Wikipedia. Published Jan. 2019. Retrieved on May 29, 2024 from: https://web.archive.org/web/20190101113045/https://en.wikipedia.org/wiki/Smart_card (Year: 2019).*

"Hardware security module". Wikipedia. Published Jan. 2019. Retrieved on May 29, 2024 from: https://web.archive.org/web/20190104231248/https://en.wikipedia.org/wiki/Hardware_security_module (Year: 2019).*

Yang et al., Information Security Basics, Southwest Jiaotong University Press, Jun. 2019, pp. 65-66, ISBN 978-7-5643-6910-1, Chengdu, China.

* cited by examiner

SYSTEM AND METHOD FOR AUTHENTICATION ON A DEVICE

FIELD AND BACKGROUND OF THE INVENTION

The invention relates to a system and a method which enable a reliable authentication of a user on an appliance even if the appliance can not communicate with an authentication server.

An IoT (Internet of Things) appliance is typically connected to a server via the Internet. A user of the IoT appliance (for example, a service engineer) can authenticate themselves on the IoT appliance, with the authenticity check mostly taking place via an authentication server. An authentication can, for example, be required to prevent unauthorized interventions on the IoT appliance.

SUMMARY OF THE INVENTION

If the Internet connection of an IoT appliance is interrupted or is unavailable, a reliable and secure authentication can mostly not be carried out (as it is not possible to access the authentication server). The present document is concerned with the technical object of enabling a secure and reliable authentication on an appliance even when the appliance is not connected to an authentication server via a communication connection.

The object is achieved by the subject matter of the independent claims in each instance. Advantageous embodiments are defined, in particular, in the dependent claims, described in the description below or represented in the accompanying drawings.

According to one aspect of the invention, a method for authentication (of a user and/or a computer unit) on an appliance is described. The appliance, in particular the IoT appliance is preferably a household appliance, in particular a washing machine, a dryer, a food processor, a cooker, an oven, a refrigerator and/or a dishwasher.

The method comprises the provision and/or the receipt of a certificate. Here, the certificate can be provided by a (certificate) server which is responsible for the administration of accesses to the appliance. The server can, for example, be made available by a manufacturer of the appliance. In addition to the certificate, (current) information relating to the appliance can be provided by the server (for example, in relation to the current status of the appliance). The information provided can lead to an increase in the quality of a subsequent access to the appliance.

In order to obtain a certificate, a server authentication process can first of all be carried out on the server to authenticate the unit (for example, a computer unit and/or a user) which wants to obtain the certificate from the server. The certificate can (possibly exclusively) be provided by the server following a successful server authentication process.

The certificate (provided by the server) enables a limited number N of authentication processes. The number N of possible authentication processes for the certificate when providing the certificate via the server preferably lies between 2 and 10. Limiting the authentication processes which can be enabled by a certificate can ensure a high level of security (also in the case of a lost certificate). The certificate can also be limited to a defined period of time.

The method furthermore comprises carrying out an authentication process on the appliance (using the certificate). As part of the authentication process, a challenge (for example, a random number) which was sent by the appliance can be received by the unit which would like to be authenticated on the appliance. Furthermore, a response to the challenge can be generated by the unit, wherein the response depends on the challenge and the certificate. The response can then be sent to the appliance, and the appliance can authenticate the unit or reject the authentication request on the basis of the response.

The method also comprises reducing the number N of authentication processes that are still possible for the certificate. In particular, after each authentication process with which the certificate is used, the number N can be reduced (by one in each case). An unauthorized authentication on an appliance can therefore be securely prevented (even in cases where no communication connection exists between the appliance and an authentication server).

The certificate can be embodied to enable a user of the certificate to access the appliance following a successful authentication process. In this context, the certificate can be embodied to limit the access to a subset of access rights from a total set of access rights. The subset of access rights can depend on a user type of the user (for example, a user of the appliance or service personnel for the appliance and/or a developer of the appliance).

The method can comprise determining a user type from a plurality of different user types. A certificate can thereupon be provided and/or received which enables one or more of the access rights to the appliance depending on the determined user type. The security of access to an appliance can therefore be increased further.

The method can comprise checking, as part of the authentication process, whether the number N of authentication processes that are still possible is greater than zero. The authentication process on the appliance can be (automatically) rejected if it is determined that the number N of authentication processes that are still possible is not greater than zero. The validity of the certificate can therefore be reliably limited.

The certificate can be provided on a hardware security module (HSM). This ensures a reliable storage of the certificate.

In this way, the number N of authentication processes that are still possible can be reduced by means of a counter on the hardware security module to allow a particularly reliable limiting of the validity of the certificate.

The method can in particular be designed to authenticate a computer unit on the appliance. Access to the certificate (for an authentication process) can then be enabled via a communication interface (for example, via a USB interface) between the computer unit and the hardware security module. The certificate can therefore be made available for use in a reliable and convenient manner.

According to one aspect of the invention, a system for authentication (of a user or a computer unit) on an appliance is described. The system is embodied to provide a certificate, wherein the certificate enables a limited number N of authentication processes. The system is furthermore embodied to carry out an authentication process on the appliance (using the certificate) and to reduce the number N of authentication processes that are still possible for the certificate.

It should be noted that any aspects of the system and/or method described in this document can be combined with one another in a wide variety of ways. In particular, the features of the claims can be combined with one another in a variety of ways.

BRIEF DESCRIPTION OF THE FIGURES

The invention will now be described in greater detail making reference to the exemplary embodiments illustrated in the drawings. In the drawings.

DETAILED DESCRIPTION OF THE INVENTION

Figure 1:
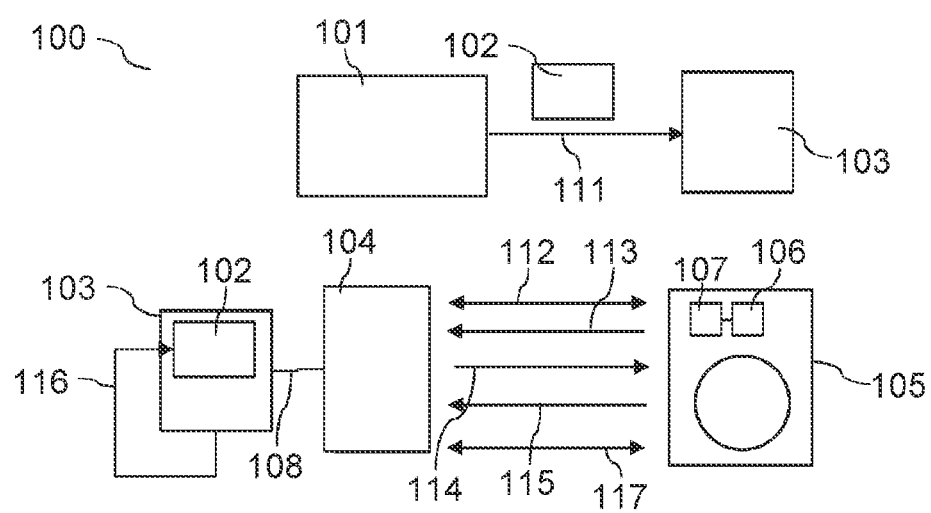
FIG. 1 shows a block diagram of a system for authenticating a user on an appliance.

As set out in the introduction, the present document concerns the efficient and secure authentication of a user or of the computer unit of a user on an appliance. In this context, FIG. 1 shows a system 100 for authentication on an appliance 105, in particular on a household appliance. The system 100 comprises a hardware security module (HSM) 103 which is embodied to receive a certificate 102 from an authentication server 101 (step 111 in FIG. 1). Here, the certificate 102 can enable access to a specific appliance 105 and/or to a specific group of appliances 105. Furthermore, the certificate 102 can define the scope of activities which can be executed in the context of an access to an appliance 105.

The certificate 102 comprises a specific (maximum) usage number, wherein the usage number shows how often or how many times the certificate 102 can and/or may be used for authentication on an appliance 105.

The certificate 102 can be stored in the HSM 103. The HSM 103 can be connected to a computer unit 104 (for example to a smartphone or a laptop computer) by a user via an interface 108 (for example, via USB). A communication connection 112 (for example, Bluetooth and/or WLAN) can be set up between the computer unit 104 and the appliance 105 to enable access to an appliance 105.

The appliance 105 can send a challenge 113 to the computer unit 104 via the communication connection 112. The challenge 113 can comprise, for example, a random number. The computer unit 104 can thereupon complete or sign the challenge 113 using the certificate (for example, by means of one of the passwords included in the certificate). On the basis of the signed challenge 113, a response 114 can then be sent from the computer unit 104 to the appliance 105. For example, the signed challenge 113 can be encrypted and/or a hash function of the signed challenge 113 can be created and sent as a response 114. On the basis of the response 114, the appliance 105 can authenticate the computer unit 104 or reject an authentication. The computer unit 104 can also be informed of the authentication result 115. Following successful authentication, the access 117 to the appliance 105 can be enabled.

The appliance 105 can comprise a communication unit 107 via which the communication with the computer unit 104 takes place. Furthermore, the appliance 105 can comprise a control unit 106 which is configured to evaluate the response 114 in order to authenticate a computer unit 104.

The HSM 103 is embodied to reduce (step 116) the remaining usage number of the certificate 102 for each authentication process. Furthermore, the HSM 103 can be configured to prevent a further use of the certificate 102 for authentication purposes if the remaining usage number of the certificate 102 is zero. Alternatively or additionally the appliance 105 can be embodied to update the usage number of a certificate 102. Furthermore, the appliance 105 can be configured to check the remaining usage number as part of an authentication process.

Without loss of generality, a customer service intervention is described below as an example of an access to an appliance 105. The method described in this document for authentication on an appliance 105, in particular a household appliance, can however in principle be used by any individual.

Figure 2:
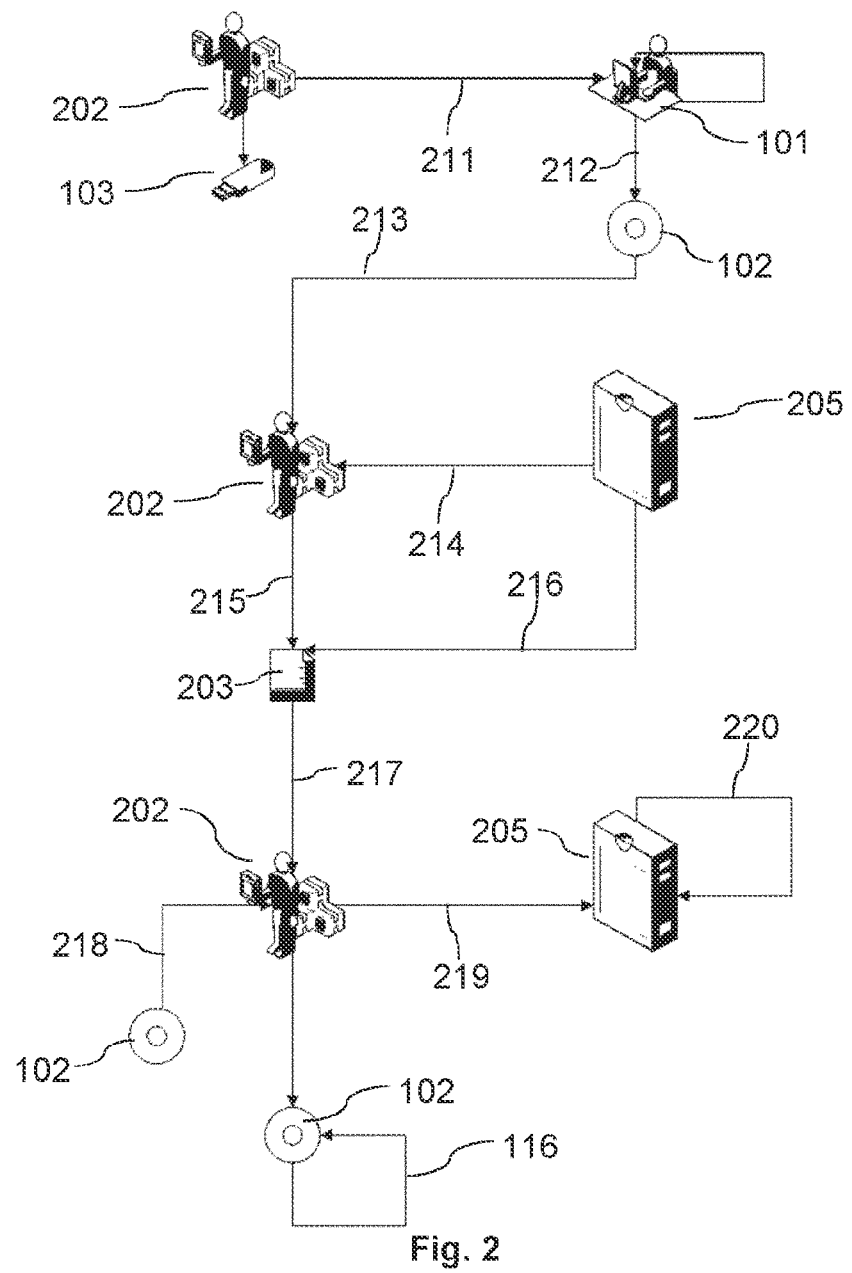
FIG. 2 shows an exemplary sequence of an authentication process on an appliance.

The user 202 (see FIG. 2), who would like to authenticate themselves on the appliance 105 or on the system master SMM 205 of the appliance 105, uses an HSM (hardware security module) 103, possibly as the only required hardware. With the aid of a (possibly freely available) web service, the user 202 can, for example, use a PC or a smartphone to authenticate themselves with a backend server 101. By specifying and evidencing specific information, a distinction can be made, where appropriate, between different user groups (for example, end user, customer service, appliance developer, etc.). The user can request (step 211) a digital certificate 102 according to their authorization, for example to carry out a customer service intervention on a particular appliance 105 or on a defined group of appliances 105. Here, the granularity of the access rights can depend on the implementation and/or the properties of the appliance 105.

A digital certificate 102 can be generated (step 212) by the backend server 101 depending on the properties of the user 202 and/or the appliance 105 or the appliance group. The digital certificate 102 can be securely stored (step 213) in the HSM 103 with the aid of one of more technologies provided by the HSM 103 (for example, "PKI as a Service", "Device Issuer CA", "Built-In PKI" and/or Secure Channel). PKI stands for public key infrastructure and CA for certification authority.

Requests for a certificate 102, which are not considered to be plausible, can be rejected by the backend server 101 (for example, too many access or certificate requests in one day). Where appropriate, requests from known, invalid users can also be rejected, allowing for example an effective revoking of certificates 102. This functionality can not typically be replicated with an implementation without HSM 103.

If access to an appliance 105 is to be implemented, the user inserts the HSM 103 into a computer unit 104 (for example in a smartphone with a USB OTG interface). A software APP on the computer unit 104 can enable (step 214) an end-to-end communication 112 between the HSM 103 and the appliance 105.

The user then proves their authorization with the certificate 102 by means of a challenge-response method (steps 215, 216, 217, 219), wherein a random number (for example, in the form of an authentication token) 203 of the appliance 105 is signed (step 218) by a private key of the certificate 102 in the HSM 103. Access can be restricted by the HSM features "Key Use Counter" and/or "Key Restriction". After each use, an internal counter is counted down (step 116). As soon as the value of the counter reaches 0, no further use is possible with the installed certificate 102. This means that a loss of the HSM 103 only has a limited impact on security.

Security can also be increased further as an option through the use of PIN management.

The measures described in this document can improve the ease of handling and increase security. Furthermore, as a new certificate 102 has to be obtained from a backend server 101 in a timely manner before each access, current information on an appliance 105 can be provided which improves access to the appliance 105. For example, information on preceding accesses and/or current software or firmware versions for an appliance 105 can be transmitted. As an alternative to an HSM 103, a JavaCard-compatible NFC smartcard which has the HSM-relevant features can be used.

Figure 3:
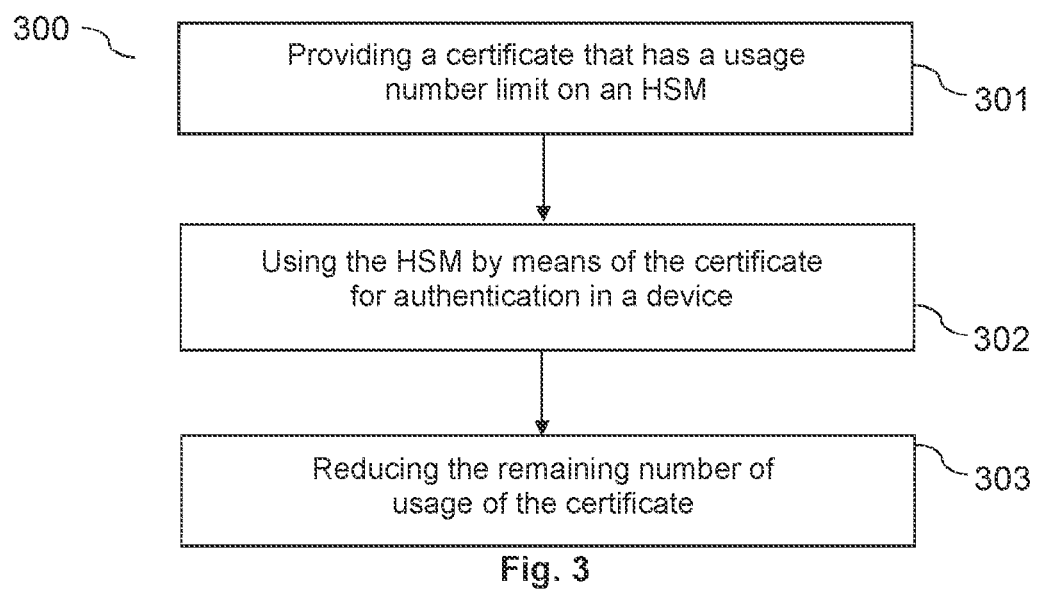
FIG. 3 shows a flow chart of an exemplary method for authentication on an appliance.

FIG. 3 shows a flow diagram of an exemplary method 300 for authentication (of a unit 104 and/or a user 202) on an appliance 105. The method 300 can be executed by a system 100 and/or by a computer unit 104. The method 300 comprises providing 301 a certificate 102, the certificate 102 enabling a limited number N of authentication processes (for example, N>1 and/or N<5 on delivery of the certificate 102).

Furthermore, the method 300 comprises carrying out 302 an authentication process on the appliance 105 using the certificate 102. The method 300 furthermore comprises reducing 303 the number N of authentication processes that are still possible for the certificate 102. In this way, the number N of authentication processes that are still possible for the certificate 102 can be reduced (by one in each case) after each authentication process. The access to an appliance 105 (or to an appliance group) can therefore be enabled and/or controlled in an efficient and secure manner.

The present invention is not restricted to the exemplary embodiments shown. In particular, it should be noted that the description and the figures are only intended to illustrate the principle of the proposed system and/or the proposed method.

The invention claimed is:

1. A method for authentication on an appliance, the method comprising:
providing a certificate on a hardware security module from an authentication server, the certificate enabling a limited number N of authentication processes;
carrying out an authentication process on the appliance to authenticate a user on the appliance;
reducing the number N of authentication processes that are still possible for the certificate;
connecting the hardware security module to a computer unit by the user via an interface, and reducing the number N of authentication processes that are still possible by a counter of the hardware security module; and
requesting the certificate by the user and rejecting requests which do not meet a predetermined threshold of plausibility; and
authenticating the computer unit on the appliance, and enabling access to the certificate via a communication interface between the computer unit and the hardware security module; and
providing information relating to the appliance from the server together with the certificate.

2. The method according to claim 1, wherein the authentication process comprises:
checking whether the number N of authentication processes that are still possible is greater than zero; and
upon determining that the number N of authentication processes that are still possible is not greater than zero, rejecting the authentication process on the appliance.

3. The method according to claim 1, wherein the method further comprises:
determining a user type from a plurality of different user types; and
providing a certificate which enables one or more specific access rights to the appliance depending on the user type.

4. The method according to claim 1, wherein the authentication process comprises:
receiving a challenge from the appliance;
determining a response to the challenge, the response depending on the challenge and the certificate; and
sending the response to the appliance.

5. The method according to claim 1, wherein the authentication server is responsible for an administration of accesses to the appliance.

6. The method according to claim 5, which further comprises:
carrying out a server authentication process on the server to authenticate a unit requesting to obtain the certificate from the server; and
providing the certificate following a successful server authentication process.

7. The method according to claim 5, wherein the number N of possible authentication processes for the certificate, when the certificate is provided via the server, lies between 2 and 10.

8. The method according to claim 1, wherein the number N of possible authentication processes for the certificate, when the certificate is first provided, lies between 2 and 10.

9. The method according to claim 1, wherein the appliance is a household appliance.

10. The method according to claim 9, wherein the household appliance is an appliance selected from the group consisting of a washing machine, a dryer, a food processor, a stove, an oven, a refrigerator, and a dishwasher.

11. The method according to claim 1, wherein:
the certificate is configured to enable a user of the certificate to access the appliance following a successful authentication process; and
the certificate is configured to limit an access to a subset of access rights from a total set of access rights.

12. A system for authentication on an appliance, the system, comprising:
a hardware security module, an authentication server, a computer unit, and an interface;
the system being configured:
to provide a certificate on the hardware security module from the authentication server, the certificate enabling a limited number N of authentication processes;
to carry out an authentication process on the appliance to authenticate a user on the appliance; and
to decrease the number N of authentication processes that are still possible for the certificate;
to connect the hardware security module to the computer unit by the user via the interface, and to reduce the number N of authentication processes that are still possible by a counter of the hardware security module;
to receive requests for a digital certificate by the user and reject requests which do not meet a predetermined threshold of plausibility; and
to authenticate the computer unit on the appliance, and to enable access to the certificate via a communication interface between the computer unit and the hardware security module; and
to provide information relating to the appliance from the server together with the certificate.

* * * * *